April 23, 1940.  A. E. JURS  2,198,116
SAMPLING DEVICE
Filed April 1, 1938  3 Sheets-Sheet 3
FIG_4_
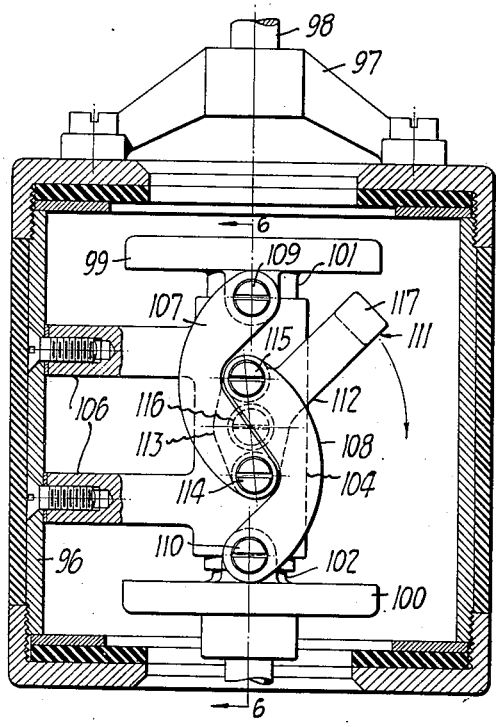
FIG_5_
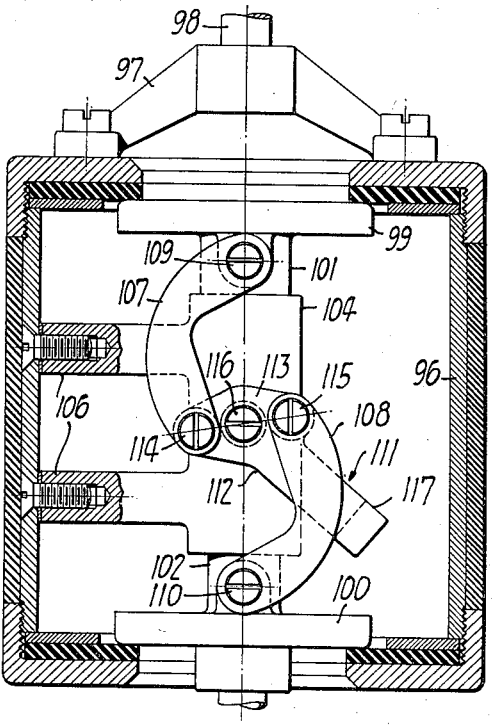
FIG_6_
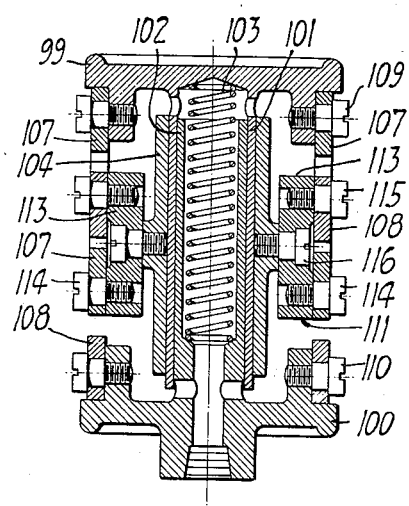
INVENTOR.
Albert E. Jurs
BY
ATTORNEY Patented Apr. 23, 1940

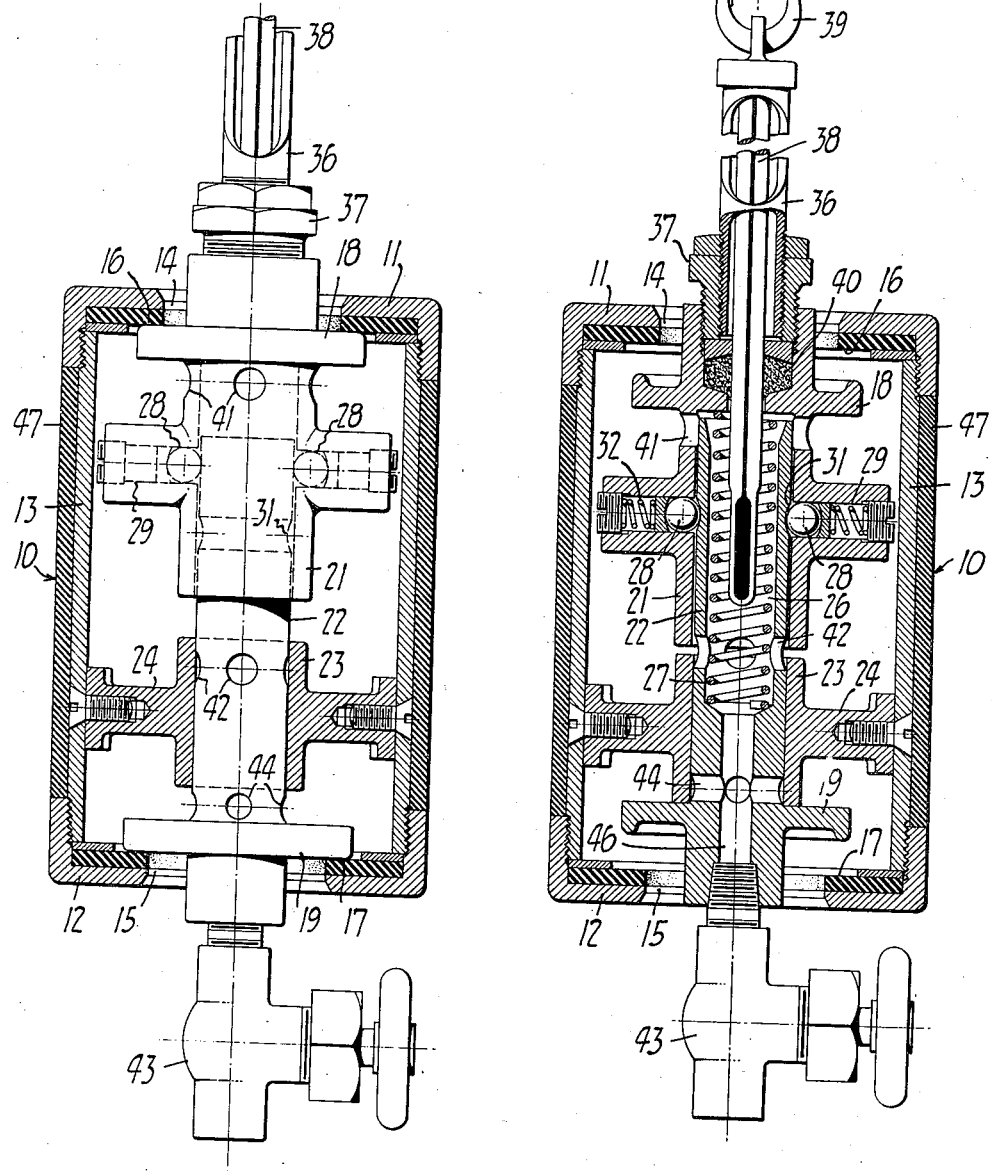

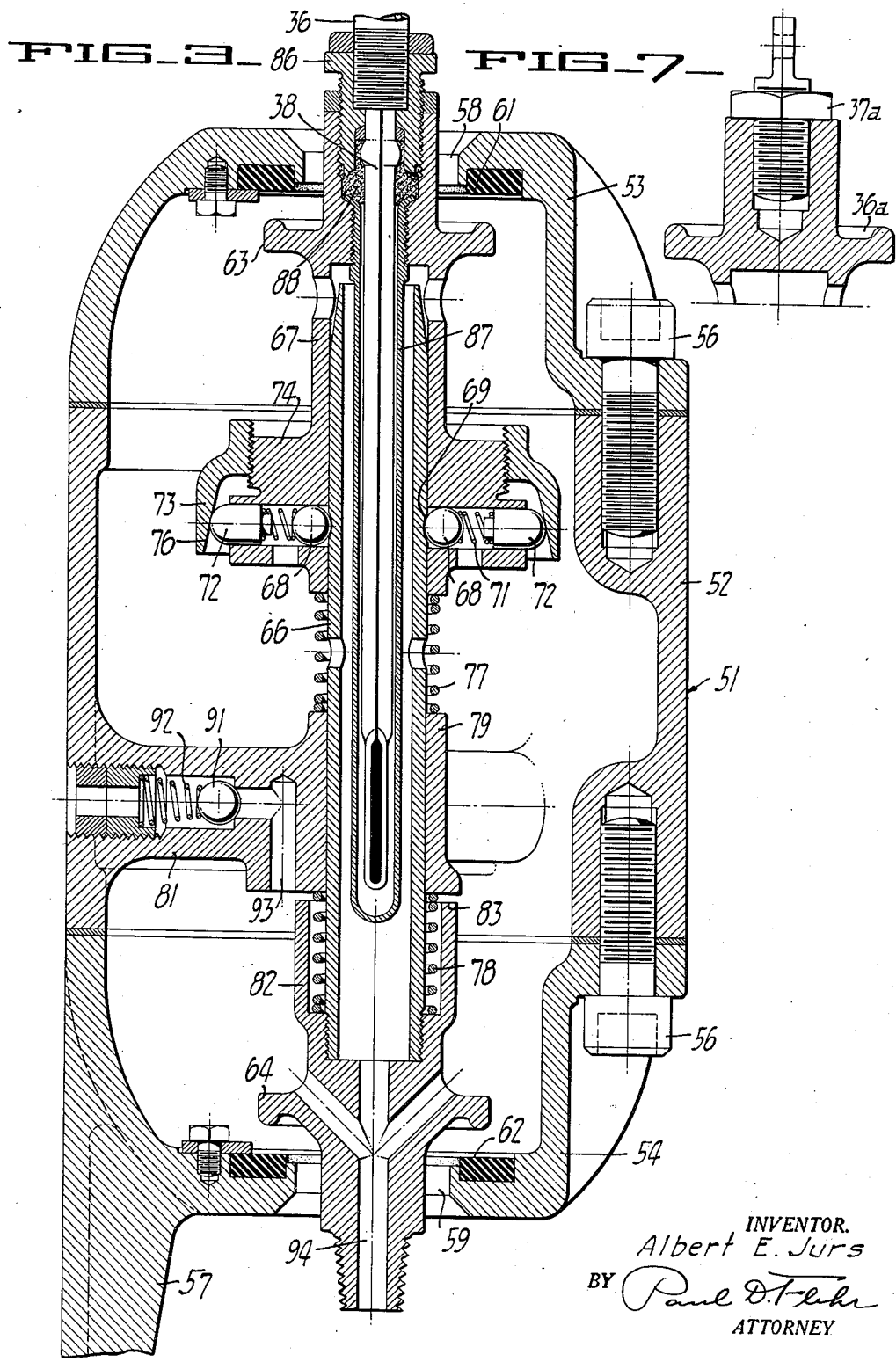

2,198,116

UNITED STATES PATENT OFFICE 2,198,116

SAMPLING DEVICE

Albert E. Jurs, Piedmont, Calif.

Application April 1, 1938, Serial No. 199,530

13 Claims. (Cl. 137—18)

This invention relates generally to apparatus for obtaining liquid samples. More particularly it relates to devices adapted to be lowered into a liquid tank, reservoir or compartment, for the purpose of obtaining a representative sample. Such devices have many useful applications, as for example in the petroleum industry, for taking samples of oil or hydrocarbon fractions from storage tanks, tank cars, or other containers. When equipped with a thermometer or other temperature indicating means, such devices are commonly referred to as "temperature thiefs."

In the past sampling devices or temperature thiefs of the above character have made use of a shell or container adapted to be lowered into a body of liquid, and arranged whereby representative samples of liquid can be trapped for removal. One such device which has met with considerable success, has made use of a shell having upper and lower openings, together with a movable valve member for closing the lower opening. Normally the valve member is maintained in open position by a latch or trigger mechanism, and after the device has been lowered into a body of liquid, the trigger mechanism is released by applying jerking movements, whereby the valve member closes the lower opening of the shell, thus permitting the shell to be lifted with a trapped quantity of liquid.

Insofar as I am aware all such prior devices are inaccurate and unsatisfactory when used with relatively volatile liquids. I have reference particularly to the lighter hydrocarbon fractions, such as methane or butane. Such liquids have considerable vapor pressure at ordinary temperatures. Highly volatile liquids like butane or methane will rapidly volatilize at atmospheric pressure, and therefore a sample of such liquid will not remain within such prior devices, when transferred from the interior of a tank under pressure, to the exterior atmosphere. Also evaporation of liquid, even within a closed tank, can cause a marked change in temperature, thus making temperature readings inaccurate.

The present invention has for its object the production of a sampling device or temperature thief which can be used successfully on all types of liquids, including highly volatile liquids like butane or methane.

Another object of the invention is to provide a temperature thief which will make possible accurate temperature readings when used with highly volatile liquids.

Further objects of the invention will appear from the following description in which the preferred embodiments of the invention have been set forth in detail in conjunction with the accompanying drawings.

Referring to the drawings:

Fig. 1 is a side elevational view, in cross-section, illustrating a sampling device incorporating the present invention.

Fig. 2 is a side elevational view of the device as shown in Fig. 1, with the valve members in closed positions.

Fig. 3 is a side elevational view, in cross-section, illustrating another embodiment of the invention.

Fig. 4 is a side elevational view, in cross-section, illustrating a third embodiment of the invention.

Fig. 5 is a side elevational view, in cross-section, similar to Fig. 4, but showing the valve members in closed positions.

Fig. 6 is a cross-sectional detail taken along the line 6—6 of Fig. 4.

Fig. 7 is a cross-sectional detail of a fitting when no thermometer is used.

In general the present invention makes use of a shell or casing in which the sample is to be trapped, and which can be lowered into a body of liquid. The valve means associated with this casing is such that the operator can cause release of the valve means to tightly close and seal the interior of the shell against release of internal pressure. Thereafter the device can be lifted from the body of the liquid and transferred to the exterior atmosphere, without causing or permitting volatilization of the trapped sample.

Referring first to that form of the invention illustrated in Figs. 1 and 2, it consists of a shell 10, which in this instance is cylindrical in shape, with end walls 11 and 12. While the structural details may vary, the main body 13 of the shell is shown formed of a length of metal pipe or tubing, with the end walls 11 and 12 in the form of caps, threaded upon the ends of the pipe. Openings 14 and 15 are formed in the end walls 11 and 12, and surrounding these openings are the annular valve seats 16 and 17. These seats are preferably made of some material capable of forming good sealing contact with the cooperating surfaces of valve members, and capable of withstanding the action of liquids with which the device is to be used. For example with a device adapted for sampling hydrocarbon liquids, the seats can be made of synthetic rubber like "Duprene" or a composition of cork and "Duprene".

A pair of valve members 18 and 19 are disposed within the shell, and in their closed positions they engage and seal upon the seats 16 and 17. In order to movably retain these valve members, they are provided with slidably engaging portions 21 and 22. Portion 21 is a sleeve carried by valve member 18, and which loosely fits about the hollow stem 22 carried by the valve member 19. Stem 22 also loosely fits within a sleeve 23, which in turn is rigidly attached to the side walls of the shell by means of radial arms 24.

Within the opening or bore 26, formed in the stem 22, there is a compression spring 27. The ends of this spring act upon the valve members 18 and 19, so that normally these valve members are urged in opposite directions, in directions to close upon the seats 16 and 17. Detent means is provided to releasably retain the valve members 18 and 19 in retracted or open positions, as shown in Fig. 1. In this instance the detent means consists of a pair of balls 28, which are loosely retained within the radial bores 29 formed in sleeve 21. Formed circumferentially about the stem 22, there is an annular groove or recess 31, within which the balls 28 may engage. Compression springs 32 urge the balls 28 towards sleeve 22, and the pressure thus applied to the balls is such that when the balls are engaged with the annular recess 31, there is sufficient restraint between sleeve 21 and stem 22, to resist the pressure of spring 27.

The device described above is normally lowered into a body of liquid by means of a cable, wire or like attachment, the pull of which is applied to the valve member 18 and sleeve 21. Thus in the embodiment of Figs. 1 and 2, which is adapted for taking temperature readings, as well as samples, an extended guard tube 36 has its lower end attached to the valve member 18, by means of a gland fitting 37. A thermometer 38 is shown disposed within the guard tube 36, and the upper end of this tube is shown having an attachment 39 to the lower end of a cable, wire or like tool which is used to lower and raise the device. The thermometer 39 extends through the packing 40, whereby its bulb is within the space 26. Space 26 is in free communication with the remainder of the interior of the shell, through the ports 41 in sleeve 21, and ports 42 in stem 22.

After obtaining a sample of liquid in the device, it is frequently desirable to remove the sample without releasing the valve members 18 and 19. For this purpose a valve 43 is shown attached to the lower end of valve member 19, and by opening this valve liquid can be drained from the interior of the shell through ducts 44 and 46, while the valve members 18 and 19 are closed.

Use of the device described above can be outlined as follows:—Valve members 18 and 19 are placed in the open positions illustrated in Fig. 1, with the detent balls 28 engaging within the annular recess 31. The lower end of a cable or like tool is now attached to the upper end of tube 36, and the device lowered into the body of liquid from which a sample is to be taken. Assuming that it is desired to take the temperature of the body of liquid at a predetermined level, the device is lowered to that level, and then permitted to remain until temperature equilibrium has been reached. During this time limited up and down movements of the device will facilitate reaching the desired temperature equilibrium, through surging of liquid through the openings 14 and 15, and through the interior of the shell. When, through experience of the operator, equilibrium conditions have been reached, a sharp upward jerk upon the supporting cable causes the detent balls 28 to be released with respect to recess 31, thus permitting the compression spring 27 to close both of the valve members 18 and 19 upon the seats 16 and 17. By reference to Fig. 1 it will be noted that prior to such closing movement the weight of the shell 10 is carried upon the valve member 19 through the sleeve 23, which rests upon the valve member. Since an upward jerk upon the cable is applied to the valve member 18 and sleeve 21, the inertia due to the weight of the shell in effect applies force tending to hold stem 22 relatively stationary, thus making it possible for an abrupt upward force applied to sleeve 21, to disengage the detent balls 28.

The position of the parts after closing of the valve members 18 and 19, is shown in Fig. 2. It will be noted that the weight of the shell is now carried upon the upper valve member 18, instead of upon valve member 19 as in Fig. 1. Also it will be noted that any pressure differential between the interior of the shell and the exterior, tends to force the valve members more firmly upon their seats. At the time the valve members are first closed no pressure differential will exist between the interior of the shell and the exterior. However, upon raising the device a pressure differential is created, but release of pressure from the interior of the shell is prevented. In taking temperature readings the operator may read the thermometer before the device has been removed from the general confines of the tank, or if desired the device may be removed to the atmosphere, before taking readings. The sample within the shell is of fixed predetermined amount, and upon draining the same from through cock 43, it may be subjected to further tests or observations, as may be desired.

The sample is not permitted to vaporize or evaporate since it is retained at precisely the original pressure at which it existed within the body of liquid. Therefore no errors in temperature readings are experienced, due to volatization, even when handling relatively volatile hydrocarbon liquids such as methane or butane. If desired the temperature reading can be made immune with respect to volatization of liquid from the wet outer surface of the shell, by covering the shell with suitable heat insulating means. Thus in the embodiment of Figs. 1 and 2, the exterior of the shell is shown provided with a heat insulating jacket 47. Where an operator is not interested in a temperature reading the thermometer can be omitted and fitting 37 can form a closure to which attachment 39 can be connected.

Fig. 3 illustrates another embodiment of the invention, which is similar in principle to the embodiment of Figs. 1 and 2, but is somewhat different as to certain features of construction. The shell 51 is formed as a three part casting, the intermediate part 52 being of generally cylindrical form, and the upper and lower parts 53 and 54 being clamped to the intermediate part by screws 56. The lower end part 54 is shown provided with a depending leg 57, for contacting the bottom of a tank. The upper and lower openings 58 and 59 are surrounded by the valve seats 61 and 62, and engaged by the valve members 63 and 64. As with the embodiment of Figs. 1 and 2, a tubular stem 66 is secured to valve member 64, and slidably engages within a sleeve 67 secured to the valve member 63. The detent balls 68 engage with the annular recess 69, as with Figs.

1 and 2, and are urged inwardly by compression springs 71.

To enable an adjustment of the pressure applied by spring 71, the outer ends of springs 71 are shown seated upon the plungers 72, and these plungers engage the inner periphery of a cam ring 73. Ring 73 has a threaded engagement with the enlargement 74 on sleeve 67, and by means of the conical shaped cam surface 76, which engages plungers 72, the turning of ring 73 in one direction or the other causes movements of the plungers 72, to vary the pressure upon springs 71. It will be evident that this mechanism is a convenient means whereby an operator may adjust the device with respect to the intensity of the jerking movement required to release the detent and permit closing of the valve members.

Instead of providing a spring within the tubular stem 66, to force the two valve members apart, a pair of compression springs 77 and 78 are provided. Interposed between these springs there is a sleeve 79, loosely fitted about tubular stem 66, and secured to the shell by means of arms 81. The upper end of spring 77 bears upon the lower end of sleeve 67, and the lower end of this spring seats upon the upper end of sleeve 79. The upper end of spring 78 bears upon the lower end of sleeve 79, and the lower end of this spring bears upon the valve member 64. It will be noted that a shroud 82 surrounds compression spring 78, and is carried by the valve member 64. When the device is supported in normal operating position, with the valve members 63 and 64 open, the lower end of sleeve 79 may either rest upon the upper end face 83 of shroud 84, or as is preferable, spring 78 can be sufficient in strength to maintain the upper end 83 of the shroud slightly spaced from the lower end of sleeve 79. Thus an upward jerk applied to means attached to valve member 63, when the device is in use, causes a pounding action of sleeve 79 upon the upper end 83 of shroud 82, to more effectively cause release of the detent.

A thermometer 38 is also shown incorporated in the embodiment of Fig. 3. The lower end of the guard tube 36, which serves as a guard for the upper end of this thermometer, is shown connected to the upper end of valve member 63, through the fitting 86. Instead of having the lower end of the thermometer directly in contact with the liquid within the shell, the thermometer is shown extended within a metal tube 87, having a closed lower end. The upper end of this tube is shown attached to the valve member 63, and is sealed with respect to the valve member and with respect to the thermometer, by means of packing 88. The interior of tube 87 contains a substance serving to efficiently transfer heat from the metal tube to the thermometer. For example a lubricating oil, mercury, graphite, etc. can be used.

Under certain circumstances the pressure developed by a sample of trapped liquid may be more than can be safely withstood by the metal shell. Therefore as a safety precaution the embodiment of Fig. 3 is provided with a safety relief valve to permit escape of liquid from the interior of the shell, should the internal pressure reach a predetermined maximum value. This check valve can be in the form of a ball check 91, disposed within one of the arms 81, and urged towards closed position by compression spring 92. A porting 93 subjects the ball check 91 to internal pressure, whereby when the internal pressure reaches a predetermined value, the ball check is opened by fluid pressure to permit pressure to be released.

A drain cock can be applied to the embodiment of Fig. 3, the same as in Fig. 1. This cock can be attached to the lower end of valve member 63 to communicate with the duct 94. The leg 57 will serve to protect such a valve cock against injury, should the device strike the bottom of a tank.

Fig. 7 shows how the device of Fig. 3 can be altered, where it is unnecessary to take temperature readings. Thus the upper valve 36a has no opening through it, as in Fig. 3. A simple fitting 37a, facilitates connection to the attachment 39.

The embodiment of Figs. 4 to 6 inclusive is similar to the two embodiments described above, except that a separate weight is provided within the shell to afford the impulse for releasing the valve members. The shell 96 in this instance is somewhat similar in construction to the shell 10 of Figs. 1 and 2, but instead of attaching a cable or like tool to one of the upper valve members, a spider 97 is shown connected to the upper end of the shell, and this spider can connect with the lower end of a rod 98. The valve members 99 and 100 have telescopic interfitting portions 101 and 102 within which is disposed a compression spring 103. Portion 101 is loosely disposed within an outer sleeve 104, which in turn is rigidly attached to the side of the shell by means of arms 106.

Interconnecting the valve members 99 and 100, there is a toggle mechanism which can be set to retain the valve members in open positions against the pressure of spring 103. Thus two pair of links 107 and 108 are provided, with the upper ends of links 107 being connected to valve member 99 by pivot studs 109, and the lower ends of links 108 likewise connected to valve member 100 by pivot studs 110. Mounted intermediate the ends of sleeve 104, there is a yoke 111, having side branches 112 formed as extensions of levers 113. The ends of levers 113 have pivotal connections 114 and 115 with the adjacent ends of links 107 and 108. Aligned studs 116, form a pivotal mounting for the yoke 111, to the sleeve 104. The free end of yoke 111 carries a weight 117. When the yoke is swung upwardly as shown in Fig. 4, with the valve members in open positions, the line of centers of pivotal connections 114 and 115 are slightly past dead center with respect to the line of centers between studs 109 and 110. Therefore the toggle is set and the two valve members are retained in open positions against the pressure of spring 103. When an upward jerk is applied to rod 98, the inertia of weight 117 causes rotation of levers 113, with the result that the toggle is broken and the two valve members moved towards closed positions as shown in Fig. 5, with rotation of the yoke to the position shown in this figure. To re-set the valve members in open positions they are forced inwardly toward each other, until the toggle mechanism is again set.

I claim:

1. In apparatus of the character described, a shell having upper and lower end walls, said walls being provided with openings, means forming valve seats upon the inner faces of said end walls, said valve seats surrounding said openings, a pair of valve members movably disposed within said shell, a spring serving to urge both said valve members in opposite directions toward said valve seats, detent means serving to retain said valve members in open retracted positions against said spring pressure, means attached to the upper valve member for supporting the device, and means for applying the weight of the shell to the lower valve member.

2. In a device of the character described, a shell, means secured to the shell whereby the shell can be lowered into a body of liquid, a pair of upper and lower spaced openings formed in the shell, valve seats formed within the shell and surrounding said openings, a pair of upper and lower valve members movably carried within the shell and movable in opposite directions to engage said valve seats, thereby sealing the interior of the shell against release of pressure, slidably interfitting members secured to said valve members, spring means serving to urge said valve members in opposite directions toward closed positions, detent means acting between slidably interfitting parts for retaining the valve members in open positions against the urge of said spring means, means attached to the upper valve member for suspending the device, and means for applying the weight of the shell to the lower valve member, whereby jerks applied from the suspending means cause release of said detent means.

3. In a device of the character described, a shell, means secured to the shell whereby the shell can be lowered into a body of liquid, a pair of upper and lower spaced openings formed in the shell, valve seats formed within the shell and surrounding said openings, a pair of upper and lower valve members movably carried within the shell and movable in opposite directions to engage said valve seats, thereby sealing the interior of the shell against release of pressure, slidably interfitting members secured to said valve members, spring means serving to urge said valve members in opposite directions toward closed positions, detent means acting between the slidably interfitting parts for retaining the valve members in open positions against the urge of said spring means, means for attaching the device to the lower end of an extended element for suspending the same, and means whereby a force impulse is transmitted to release said detent means, upon applying sudden movement to said element.

4. Apparatus for sampling liquids adapted to be lowered into a body of liquid, said apparatus comprising a suspension means, a shell having a pressure chamber therein provided with at least two openings at spaced points in the walls thereof, a valve member disposed within said pressure chamber for each of said openings and movable outwardly to closed position against its corresponding opening, means for urging each said valve member towards closed position to effect a tight closure of its corresponding opening and seal said chamber against escape of liquid by pressure in said chamber, and means for releasably retaining said valve members in open position, the portion of said apparatus suspended from said suspension means including a mass movable relative to said suspension means in response to sudden jerking of said apparatus through said suspension means for effecting release of said valve members.

5. Apparatus for sampling liquids adapted to be lowered into a body of liquid, said apparatus comprising a suspension means, a shell having a pressure chamber therein provided with at least two openings at spaced points in the walls thereof, a valve member disposed within said pressure chamber for each of said openings and movable outwardly to closed position against its corresponding opening, means for urging each said valve member towards closed position to effect a tight closure of its corresponding opening and seal said chamber against escape of liquid by pressure in said chamber, and means positioned within said pressure chamber for releasably retaining said valve members in open position, the portion of said apparatus suspended from said suspension means including a mass movable relative to said suspension means in response to sudden jerking of said apparatus through said suspension means for effecting release of said valve members.

6. Apparatus for sampling liquids adapted to be lowered into a body of liquid, said apparatus comprising a suspension means, a shell having a pressure chamber therein provided with at least two openings at spaced points in the walls thereof, a valve member disposed within said pressure chamber for each of said openings and movable outwardly to closed position against its corresponding opening, means for urging said valve members in opposite directions toward closed position to effect a tight closure of said openings and seal said chamber against escape of liquid by pressure in said chamber, and means for releasably securing said valves together for retaining said valve members in open position, the portion of said apparatus suspended from said suspension means including a mass movable relative to said suspension means in response to sudden jerking of said apparatus through said suspension means for effecting release of said valve members.

7. Apparatus for sampling liquids adapted to be lowered into a body of liquid, said apparatus comprising a suspension means, a shell having a pressure chamber therein provided with at least two openings at spaced points in the walls thereof, a valve member disposed within said pressure chamber for each of said openings and movable outwardly to closed position against its corresponding opening, means for urging said valve members in opposite directions toward closed position to effect a tight closure of said openings and seal said chamber against escape of liquid by pressure in said chamber, detent means carried by one of said valve members within said pressure chamber and engaging the other of said valve members, resilient means urging said detent member into locking engagement with said other valve member for releasably retaining said valve members in open position, the portion of said apparatus suspended from said suspension means including a mass movable relative to said suspension means in response to sudden jerking of said apparatus through said suspension means for overcoming said resilient means and effecting release of said valve members.

8. Apparatus for sampling liquids adapted to be lowered into a body of liquid, said apparatus comprising a suspension means, a shell having a pressure chamber therein provided with openings in the upper and lower walls thereof, a valve member disposed within said pressure chamber for the opening in the upper wall of said chamber, a valve member disposed within said pressure chamber for the opening in the lower wall of said chamber, said valve members being movable upwardly and downwardly, respectively, to close said openings, means for urging said valve members toward closed position to effect a tight closure of said openings and seal said chamber against escape of liquid by pressure in said chamber, means for releasably retaining said valve members in open position, said suspension means being attached to said upper valve member and said shell constituting a mass movable relative to said suspension means in response to sudden jerking of said apparatus through said suspension means for effecting release of said valve members.

9. Apparatus for sampling liquids adapted to be lowered into a body of liquid, said apparatus comprising a suspension means, a shell having a pressure chamber therein provided with at least two openings at spaced points in the wall thereof, a valve member disposed within said pressure chamber for each of said openings and movable outwardly to closed position against its corresponding opening, means for urging each said valve member to closed position to effect a tight closure of its corresponding opening and seal said chamber against escape of liquid by pressure in said chamber, toggle means for releasably retaining said valve members in open position, a mass positioned in said pressure chamber and movable relative to said suspension means in response to sudden jerking of said apparatus through said suspension means for releasing said toggle means to effect release of said valve members.

10. Apparatus for sampling liquids adapted to be lowered into a body of liquid, said apparatus comprising a suspension means, a shell having a pressure chamber provided with at least two openings at spaced points in the walls thereof, a valve member disposed within said pressure chamber for each of said openings and movable outwardly to closed position against its corresponding opening, means urging each said valve member toward closed position to effect a tight closure of its corresponding opening and seal said pressure chamber against escape of liquid by pressure in said chamber, means for releasably retaining said valve members in open position and for releasing said valve members, and additional manually operable valve means for venting liquid from said chamber to relieve said pressure in said chamber and enable said valve members to be moved to open position.

11. Apparatus for sampling liquids adapted to be lowered into a body of liquid, said apparatus comprising a suspension means, a shell having a pressure chamber provided with at least two openings at spaced points in the walls thereof, a valve member disposed within said pressure chamber for each of said openings and movable outwardly to closed position against its corresponding opening, means urging each said valve member toward closed position to effect a tight closure of its corresponding opening and seal said pressure chamber against escape of liquid by pressure in said chamber, means for releasably retaining said valve members in open position and for releasing said valve members, and additional manually operable valve means for venting liquid from said chamber to relieve said pressure in said chamber and enable said valve members to be moved to open position, said manually operable valve means being carried by one of said valve members.

12. Apparatus for sampling liquids adapted to be lowered into a body of liquid, said apparatus comprising a suspension means, a shell having a pressure chamber provided with at least two openings at spaced points in the walls thereof, a valve member disposed within said pressure chamber for each of said openings and movable outwardly to closed position against its corresponding opening, means urging each said valve member toward closed position to effect a tight closure of its corresponding opening and seal said pressure chamber against escape of liquid by pressure in said chamber, means for releasably retaining said valve members in open position and for releasing said valve members, additional manually operable valve means for venting liquid from said chamber to relieve said pressure in said chamber and enable said valve members to be moved to open position, and means for connecting the interior of said chamber to a closed vessel through said manually operable valve means.

13. Apparatus for sampling liquids adapted to be lowered into a body of liquid, said apparatus comprising a suspension means, a shell having a pressure chamber therein provided with at least two openings at spaced points in the walls thereof, a valve member disposed within said pressure chamber for each of said openings and movable outwardly to closed position against its corresponding opening, means for urging each said valve member towards closed position to effect a tight closure of its corresponding opening and seal said chamber against escape of liquid by pressure in said chamber, means for releasably retaining said valve members in open position, the portion of said apparatus suspended from said suspension means including a mass movable relative to said suspension means in response to sudden jerking of said apparatus through said suspension means for effecting release of said valve members, and additional manually operable valve means for venting liquid from said chamber to relieve said pressure in said chamber and enable said valve members to be moved to open position.

ALBERT E. JURS.